United States Patent [19]
Reed et al.

[11] Patent Number: 5,815,518
[45] Date of Patent: Sep. 29, 1998

[54] ARTICLE COMPRISING A CASCADED RAMAN FIBER LASER

[75] Inventors: William Alfred Reed, Summit; Andrew John Stentz, Scotch Plains; Thomas A. Strasser, Chatham, all of N.J.

[73] Assignee: Lucent Technologies Inc., Murray Hill, N.J.

[21] Appl. No.: 871,023

[22] Filed: Jun. 6, 1997

[51] Int. Cl.$^6$ ............................... H01S 3/30; G02B 6/34
[52] U.S. Cl. ................................. 372/6; 372/3; 372/70; 372/72; 372/99; 372/102; 359/334; 359/341; 359/345; 359/346; 385/37
[58] Field of Search ............................. 372/3, 6, 69, 70, 372/72, 92, 99, 102; 359/333, 334, 341, 345, 346; 385/31, 37

[56] References Cited

U.S. PATENT DOCUMENTS

| | | | |
|---|---|---|---|
| 4,685,107 | 8/1987 | Kafka et al. ................................ | 372/6 |
| 4,794,598 | 12/1988 | Desurvire et al. .......................... | 372/3 |
| 5,305,335 | 4/1994 | Ball et al. ................................... | 372/6 |
| 5,323,404 | 6/1994 | Grubb ........................................ | 372/6 |
| 5,473,622 | 12/1995 | Grubb ........................................ | 372/6 |
| 5,530,710 | 6/1996 | Grubb ........................................ | 372/6 |
| 5,541,766 | 7/1996 | Mizrahi et al. ......................... | 359/337 |
| 5,564,832 | 10/1996 | Ball et al. ............................... | 372/6 X |
| 5,623,508 | 4/1997 | Grubb et al. ............................... | 372/3 |
| 5,666,372 | 9/1997 | Ball et al. ................................... | 372/6 |
| 5,673,280 | 9/1997 | Grubb et al. ............................... | 372/3 |
| 5,731,892 | 3/1998 | DiGiovanni et al. .................... | 359/341 |

OTHER PUBLICATIONS

"High Pressure $H_2$ Loading as a Techinique for Achieving Ultrahigh UV Photosensitivity and Thermal Sensitivity in $GeO_2$ Doped Optical Fibres", by P. J. Lemaire et al., *Electronics Letters*, vol. 29,No. 13, 24th Jun. 1993, pp. 1191–1193.

"Optical Properties of Photosensitive Fiber Phase Gratings", by V. Mizrahi et al., *Journal of Lightwave Technology*, vol. 11, No. 10, Oct. 1993, pp. 1513–1517.
OFC '96, San Jose,California,Tutorial Sessions Handbook, by S. G. Grubb, p., 243 (1996).
W.A. Reed et al. *OFC '95 Technical Digest*, vol. 8, pp. 107–108, WD1.

*Primary Examiner*—Brian Healy
*Attorney, Agent, or Firm*—Eugen E. Pacher

[57] ABSTRACT

The conversion efficiency of a cascaded Raman laser (CRL) can be significantly improved if it comprises one or more of the below recited design features. The CRL comprises an intracavity section between an input section and an output section. The CRL is adapted for receiving pump radiation of wavelength $\lambda_p$, and for emitting output radiation of wavelength $\lambda_n > \lambda_p$, and each of the input section and output section comprises fiber Bragg gratings of center wavelengths $\lambda_1, \lambda_2 \ldots \lambda_n$, where $n \geq 2$ and $\lambda_1 < \lambda_2 < \ldots \lambda_{n-1}$. Among the efficiency-increasing features is ordering of the fiber Bragg gratings such that in the input section and the output section the gratings of center wavelengths $\lambda_1 \ldots \lambda_n$ and $\lambda_1 \ldots \lambda_{1-1}$, respectively, are disposed in sequence according to center wavelength, with center wavelengths increasing with increasing distance from the intracavity section. In a preferred embodiment the fiber Bragg grating of center wavelength $\lambda_n$ of the output section is disposed between the intracavity section and the grating with center wavelength $\lambda_1$. Other efficiency-increasing features are choice of the $\lambda_n$ grating in the output section such that it has a reflectivity in the range 10–25%, disposition of a grating of center wavelength $\lambda_p$ in the output section downstream of the $\lambda_{n-1}$ grating, choice of at least some of the fiber Bragg gratings such that their reflectivity has full width at half maximum in the range 0.8–2.0 nm, selection of the fiber Bragg gratings such that the center wavelength spacing between successive gratings corresponds to a frequency shift in the range 11.7–14.9 THz, choice of a specified optical fiber refractive index profile, and use of an intracavity section of length in the range 300–1200 m.

15 Claims, 2 Drawing Sheets

ISLAND 1        OCEAN        ISLAND 2

ARTICLE COMPRISING A CASCADED RAMAN FIBER LASER

FIELD OF THE INVENTION

The invention pertains to cascaded Raman fiber lasers, and to articles and systems (collectively "articles") that comprise such a laser.

BACKGROUND

Cascaded Raman lasers (CRL) are known. See, for instance, U.S. Pat. No. 5,323,404, incorporated herein by reference.

Briefly, Raman lasers are based on Raman scattering, a non-linear optical process that involves coupling of light propagating through a non-linear medium (herein generally an optical fiber, typically a silica-based optical fiber) to vibrational modes of the non-linear medium and re-radiation at a different (typically longer) wavelength.

A "cascaded" Raman laser herein is a Raman laser that has, in addition to an optical cavity for the output radiation of wavelength $\lambda_n$, at least one further optical cavity for radiation of wavelength $\lambda_{n-1} < \lambda_n$, where $n \geq 2$.

When fused silica is used as the non-linear medium, the maximum Raman gain occurs at a frequency shift of 13.2 THz, corresponding to a wavelength shift of about 50–100 nm for pump wavelengths between about 1 and 1.5 $\mu$m.

CRLs exemplarily can be used as pump lasers for Raman amplifiers at 1310 or 1550 nm, or as 1480 nm pump lasers for, e.g., remotely pumped Er fiber amplifiers in repeaterless optical fiber communication systems. Uses for other purposes or at other wavelengths are possible and are contemplated.

Prior art CRLs can be compact, convenient light sources having relatively high (e.g., about 35%) conversion efficiency. However, even small improvements in conversion efficiency can have considerable economic impact. For instance, an increase in conversion efficiency of as little as a few percent can significantly increase the reliability of the semiconductor pump laser diodes since the reliability of such lasers frequently has a superlinear dependence on output power. Reliability being a significant concern in optical fiber communication systems, it would be highly desirable to have available improved CRLs that can yield increased conversion efficiency. This application discloses such CRLs, and articles that comprise such CRLs.

GLOSSARY AND DEFINITIONS

The distance between two longitudinally spaced features of an optical fiber herein is the distance along the axis of the optical fiber.

The "intracavity section" of a fiber Raman laser herein is the grating-free central section of the fiber between the input section and the output section, and the input section and output section (collectively "end sections") contain all the fiber Bragg gratings of the Raman laser.

Two spaced apart short period fiber Bragg gratings of equal center wavelength form an "optical cavity" for radiation of wavelength equal to the center wavelength.

SUMMARY OF THE INVENTION

In a broad aspect the invention is embodied in an article that comprises a CRL having features that can result in substantially increased conversion efficiency, as compared to analogous prior art CRLs.

More specifically, the CRL is adapted for receiving pump radiation of wavelength $\lambda_p$ and for emitting output radiation of wavelength $\lambda_n > \lambda_p$. The CRL comprises a length of optical fiber (typically silica-based optical fiber comprising a Ge-doped core contactingly surrounded by a cladding of lower index of refraction than the core) that comprises an intracavity section of length L (typically hundreds of meters) disposed between an input section and an output section (each typically of order 1 m long). The input section and output section each comprises fiber Bragg gratings having center wavelengths $\lambda_1, \lambda_2 \ldots \lambda_n$, where $n \geq 2$ and $\lambda_1 < \lambda_2 < \ldots \lambda_n$.

Significantly, in the input section the fiber Bragg gratings are disposed in sequence according to center wavelength, with the center wavelength increasing with increasing distance from the intracavity section. In the output section the fiber Bragg gratings of center wavelengths $\lambda_1, \lambda_2 \ldots \lambda_{n-1}$ are disposed according to center wavelength, with center wavelength increasing with increasing distance from the intracavity section, and the fiber Bragg grating of center wavelength $\lambda_n$ is disposed between the intracavity section and the fiber Bragg grating with center wavelength $\lambda_{n-1}$.

In preferred embodiments a pump reflector grating is farther from the intracavity section than the $\lambda_1$ grating of the output side (typically farther than the $\lambda_{n-1}$ grating), the highly reflective gratings have reflection bandwidth in the range 0.8–2.0 nm, the output coupler has a maximum reflectivity in the range 10–25%, the frequency shift between successive Raman laser stages falls in the range 11.7–14.9 THz, the intracavity optical fiber has a core with delta of 1–1.8% and a cladding with delta –0.05 to –0.1%, and/or the length of the intracavity section is in the range 300–1200 m.

The above recited features of preferred embodiments of the invention each typically yields an incremental conversion efficiency improvement, of order 1% or so, and are optional, and any number of them (including none) can be used. On the other hand, the ordering of the gratings (including placement of the output coupler closer to the intracavity section than the $\lambda_{n-1}$ grating, typically closer than the $\lambda_1$ grating) can result in conversion efficiency improvement of order 10% or so, and is considered a significant feature of CRLs according to this invention. Full improvement typically requires appropriate adjustment of the length of the intracavity section.

DETAILED DESCRIPTION

CRLs according to the invention can have significantly higher conversion efficiency than analogous prior art CRLs.

An important aspect of CRLs according to the invention is the ordering of the fiber Bragg gratings (and therefore of the optical cavities), as will be discussed in detail below.

U.S. Pat. No. 5,323,404 discloses a variety of ordering schemes (see, for instance, FIGS. 1 and 2, and associated text), and teaches (see col. 5, lines 44–48) that ". . . in-line refractive index gratings can be essentially 100% transmissive at wavelengths outside of the reflection band, thereby enabling flexibility in the placement of reflectors. For instance, the optical cavities may be sequential or overlapping to various degrees." However, we are unaware of any disclosure or suggestion of the specific ordering of instant claim 1. See also FIG. 4 of the '404 patent and associated text, which disclose a Raman amplifier, with the center wavelengths of the fiber Bragg gratings increasing with increasing distance from the intracavity section. See also, S. G. Grubb, OFC '96, San Jose, Calif., Tutorial Sessions Handbook, p. 243 (1996), which discloses on p. 256 a CRL with gratings of center wavelength that increases with distance from the intracavity section, and with the pump reflector immediately downstream of the intracavity section, and with the output coupler farthest from the intracavity section. See also pp. 258 and 259.

The existence of two loss mechanisms that are associated with short period Bragg gratings written in silica-based single mode fiber is known. See, for instance, V. Mizrahi et al., *J. of Lightwave Technology*, Vol. 11, p. 1513 (1993), and P. J. Lemaire et al., *Electronics Letters*, Vol. 29, p. 1191 (1993). The former discusses a loss mechanism that involves coupling to backward-propagating cladding modes at wavelengths slightly shorter than the Bragg resonance wavelength (center wavelength) of the grating, and the latter discusses a broadband background loss induced by the UV radiation that is used to "write" the grating.

Figure 1:
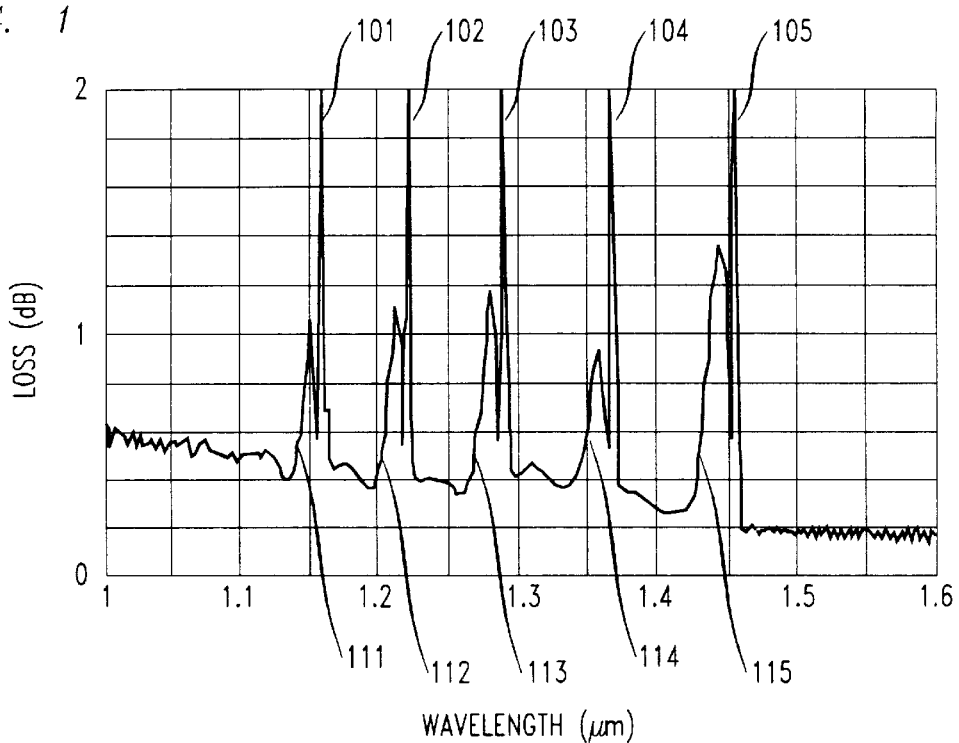
FIG. 1 shows an exemplary loss spectrum for a sequence of fiber gratings.

FIG. 1 is the transmission spectrum of a sequence of five gratings (namely, the output set of gratings for a 1450 nm CRL) and clearly shows the effects of these loss mechanisms. Numerals 101–105 refer to Bragg reflections of the respective gratings, and numerals 111–115 refer to the loss peaks due to the cladding-mode coupling. The tail (e.g., 12) of the cladding-mode loss from a given Bragg reflector extends to the wavelength of the neighboring grating on the short wavelength side.

Figure 2:
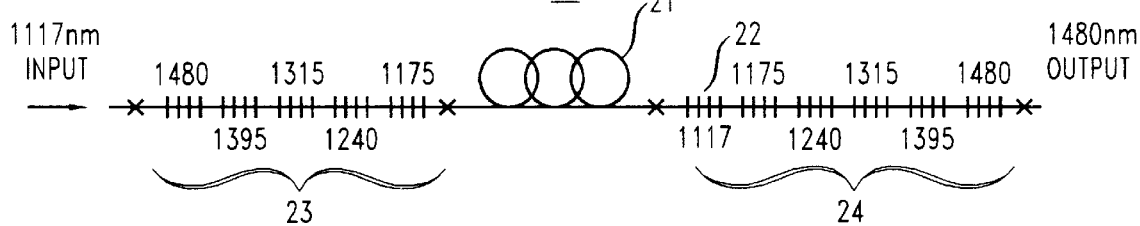
FIG. 2 schematically shows a CRL according to the prior art.

In order to increase the conversion efficiency of CRLs, cavity losses, including losses due to the above discussed mechanisms, should be minimized. It has been found that appropriate ordering of the fiber Bragg gratings can significantly decrease the loss due to the discussed mechanisms. Prior art ordering is illustrated in FIG. 2, which schematically shows an exemplary CRL 20 that is adapted for receiving pump radiation (exemplarily 1117 nm radiation) and converting the pump radiation to output radiation (exemplarily 1480 nm radiation). Numeral 21 refers to the intracavity section of the laser, and numerals 23 and 24 refer to the input section and output section, respectively. Splices are indicated in conventional manner by "x". At least in principle the laser could be made without splices between the intracavity section and the input and output sections, respectively. However, for reasons of ease of manufacture it is typically preferable to fusion splice the end sections to the intracavity section after the gratings are written in the end sections. The fiber in the end sections is typically the same as in the intracavity section.

The input section exemplarily comprises five fiber Bragg gratings, with center wavelengths 1175, 1240, 1315, 1395 and 1480 nm, respectively. The input section thus comprises gratings of increasing center wavelength with increasing distance from the intracavity section. The output section also comprises five gratings that match the gratings in the input section, with center wavelengths (exemplarily 1175, 1240, 1315, 1395 and 1480 nm) increasing with increasing distance from the intracavity section. Each pair of fiber Bragg gratings (e.g., the two gratings with 1175 nm center wavelength) forms an optical cavity, with the gratings having high reflectivity (e.g., >95%).

Pump radiation can propagate essentially unimpeded through the input section into the intracavity section, where most of it will be converted by Raman scattering to 1175 nm radiation, which is then reflected by the 1175 nm grating in the output section. The reflected 1175 nm radiation is then substantially converted by Raman scattering to 1240 nm radiation, which is reflected by the 1240 nm grating in the input section. This process of wavelength conversion by Raman scattering continues until 1480 nm radiation is produced. This radiation is then available for utilization.

In FIG. 2, the output section also comprises a 1117 nm grating 22 that serves as pump reflector. Placement of the pump reflector immediately downstream of the intracavity section, as shown in FIG. 2, is possible but not optimal, as will be discussed below.

The above discussion of the laser action is highly simplified, since typically a photon will be reflected back and forth in an optical cavity before it undergoes Raman scattering that results in a photon of longer wavelength that then passes out of the cavity into the next optical cavity.

Figure 3:
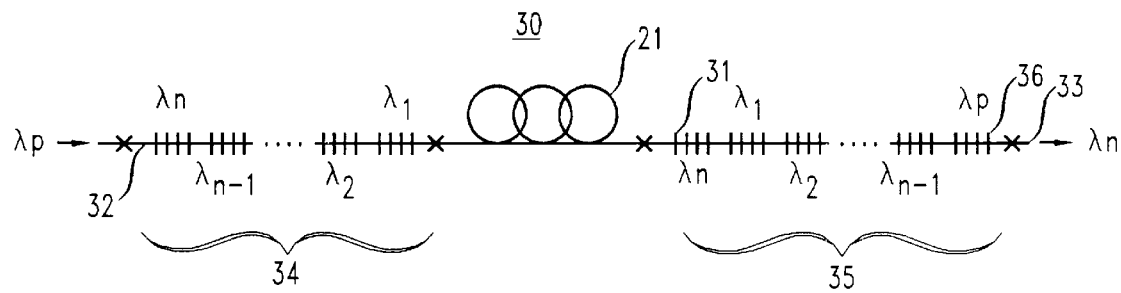
FIG. 3 schematically shows a CRL according to the invention.

A preferred CRL according to this invention is illustrated in FIG. 3, wherein numerals 32 and 33 refer to conventional fiber "pigtails", 34 and 35 to the input and output sections, respectively, 31 to the output coupler, and 36 to the pump reflector. The various gratings are distinguished by their center wavelengths, with $\lambda_1 < \lambda_2 < \ldots \lambda_{n-1} < \lambda_n$.

Having illustrated the ordering of the fiber Bragg gratings in FIG. 3, it will now be easier to understand why this ordering results in decreased loss and therefore increased conversion efficiency.

Given the experimental fact that cladding-mode coupling from one grating results in loss at the short wavelength side of the grating, the described ordering reduces the total cladding-mode loss of the CRL substantially to that due to the $\lambda_p$ radiation passing through the $\lambda_1$ grating in the input section. Furthermore, although the longer wavelengths oscillate with a substantial number of non-resonant gratings within the cavity, this does not result in significant loss since the longer wavelengths experience less background loss than the shorter ones. Thus, both background loss and cladding mode loss are significantly reduced by appropriate ordering of the gratings.

We also have found that the conversion efficiency of a CRL can be significantly affected by the placement of the output coupler, the output-section grating of the optical cavity for the output radiation. The output coupler typically is a relatively weak grating (exemplarily only about 20% reflectivity at the center wavelength), and therefore does not produce any significant cladding mode coupling. Consequently the conversion efficiency can be improved by moving the output coupler to a position closer to the intracavity section than is shown in FIG. 2. In preferred CRLs according to this invention the output coupler is the output section grating closest to the intracavity section, as is shown in FIG. 3.

In FIG. 3, numeral 32 and 33 refer to conventional fiber "pigtails", 34 and 35 to the input and output sections, respectively, 31 to the output coupler, and 36 to the pump reflector. The various gratings are distinguished by their center wavelengths, with $\lambda_1<\lambda_2< \ldots \lambda_{n-1}<\lambda_n$.

Disposing the output coupler as disclosed introduces no appreciable cladding-mode loss to the resonant shorter wavelengths but can significantly reduce the background loss experienced by the output radiation ($\lambda_n$).

The pump reflector 36 typically is a strong grating (reflectivity at $\lambda_p$ exemplarily >95%) that can introduce significant background loss. We have found that the background loss of a CRL can be reduced if the pump reflector is an output section grating that is disposed further from the intracavity section than the $\lambda_1$ grating, preferably farthest from the intracavity section, as shown schematically in FIG. 3, which schematically shows a currently preferred embodiment of the invention. However, the pump reflector placement as shown in FIG. 3 is optional. For instance, if the pump reflector grating could be made relatively weak then the pump reflector could be disposed closer to the intracavity section, e.g., as shown in FIG. 2.

Ordering the gratings as shown in FIG. 3 can result in significant conversion efficiency increase. For instance, a CRL according to the invention ($\lambda_p$=1117 nm, $\lambda_n$=1480 nm) had 9% higher slope efficiency for the conversion of 1117 light to 1480 nm light, as compared to a prior art CRL that differed only with respect to grating order.

We have also discovered that conversion efficiency can be increased by appropriate choice of grating bandwidths. For instance, decreasing the bandwidths (full width at half maximum or FWHM) of all high reflectivity gratings from a conventional 2.3 nm to 1.8 nm has resulted in a 4% efficiency improvement. Thus, preferred CRLs according to the invention will typically have high reflectivity (>95%, preferably >98%) gratings of bandwidth in the range 0.8–2.0 nm. The pertinent consideration for selection of a minimum spectral bandwidth is a desire for high grating reflectivity over a spectral bandwidth that allows for good overlap between two gratings that form a resonant cavity, since otherwise power reflected from one grating will be weakly reflected from the second grating, adding a significant cavity loss mechanism. Since current grating fabrication technology is limited to a wavelength accuracy of ~0.1 nm, the high reflectivity bandwidth must be >>0.1 nm (e.g., ~0.3 nm) to assure that the high reflectivity region has good overlap. It is understood by those skilled in the art of fiber gratings that the relationship between the high reflectivity bandwidth and the FWHM are determined by the grating length. A minimum FWHM of 0.8 nm is dependent in part on grating length. If gratings with a length less than 1 cm are used, the high reflectivity bandwidth is typically limited to approximately one-half the FWHM.

We have also found that the selection of output coupler strength can affect the conversion efficiency. For instance, in a CRL as described above, with ~4 W pump power, optimal conversion efficiency was attained with an output coupler of about 20% reflectivity. In practice, optimal output coupler strength will typically depend on many factors, and it is not generally possible to predict the optimal value. However, the optimal value is readily experimentally determinable, and will typically be in the range 10–25%.

It is known that in fused silica the maximum Raman gain occurs at a frequency spacing of 13.2 THz. In germanosilicate fibers the maximum gain occurs at a slightly larger shift, due to the contribution of $GeO_2$ to the Raman susceptibility. In CRLs it will frequently be the case that the desired pump wavelength and output wavelength are not separated by a multiple of the maximum gain frequency shift. However, we have established that the use of non-optimal frequency shifts does not necessarily result in unacceptable decrease of conversion efficiency. Specifically, for frequency shifts between 11.7 THz and 14.9 THz in Ge-doped silica fiber the Raman gain coefficient is at least 90% of its maximum value, and choice of gratings of corresponding differences in center wavelengths results in little penalty in conversion efficiency, but allows the CRL designer greater freedom in the choice of pump radiation and output radiation.

In order to minimize lasing thresholds and to increase the Raman susceptibility, it is typically desirable to use a germanosilicate fiber with relatively high delta ($\Delta$) and with relatively small effective core. However, fibers with small effective core frequently exhibit anomalous loss that is detrimental to CRL performance. Furthermore, the high $\Delta$ fiber desirably should be able to be spliced to itself (to splice the input and output sections to the intracavity section) as well as to fiber of a different design (the input and output pigtails). For obvious reasons, all splices must have low loss.

We have found that the above requirements can be met if the high $\Delta$ fiber has fluorinated cladding, and if the pigtails are matched-clad fibers. This choice of fibers can facilitate splicing to the pigtails by differential diffusion, without loss of the ability to splice to itself, if the high $\Delta$ fiber has core $\Delta$ in the range 1.0–1.8% and a cladding doped with fluorine to a $\Delta$ of –0.5–0.1%. The terminology (core, cladding, delta or $\Delta$, matched cladding) is conventional and well understood by those skilled in the relevant art. For instance core A $\Delta$ is defined as $(n_c-n_o)/n_o$, where $n_c$ is the core effective refractive index and $n_o$ is the refractive index of fused silica, and cladding $\Delta$ is defined as $(n_{cl}-n_o)/n_o$, where $n_{cl}$ is the refractive index of the F-doped cladding.

Figure 4:
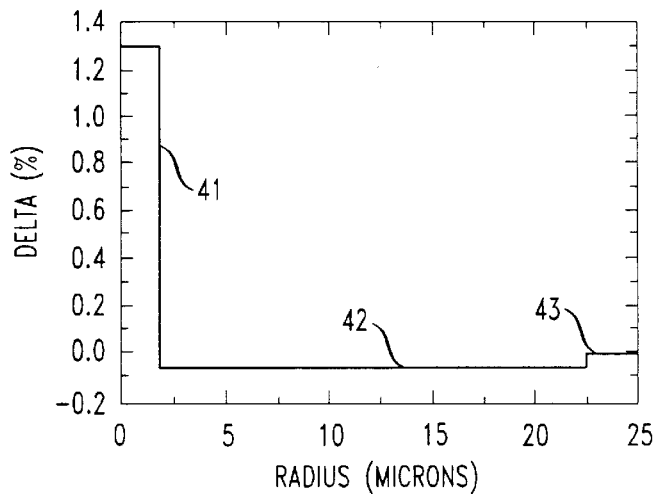
FIG. 4 shows the nominal $\Delta$-profile of an exemplary optical fiber for a CRL according to the invention.

FIG. 4 shows the delta profile (directly related to the refractive index profile) of an optical fiber that is advantageously used as intracavity section and output section in a CRL according to the invention. In FIG. 4, numerals 41–43 refer, respectively, to the core, the inner cladding, and the outer cladding which typically extends to the outer surface of the fiber.

Figure 5:
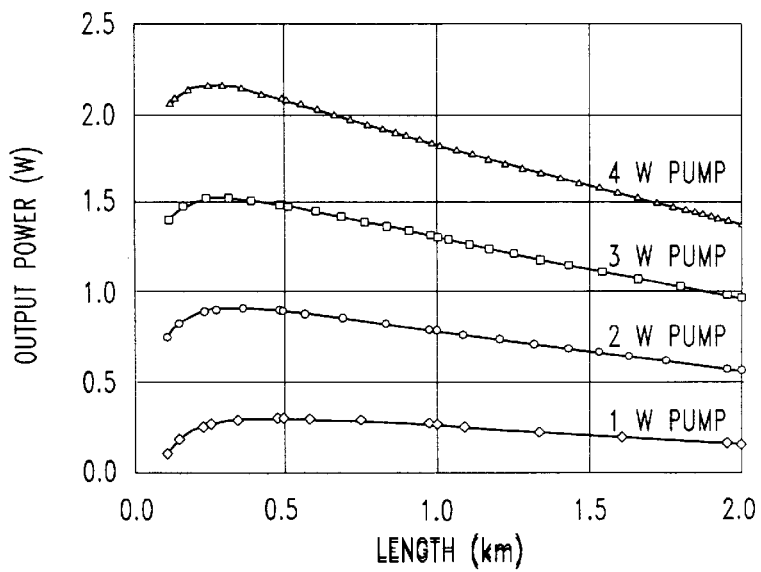
FIG. 5 shows calculated curves of output power vs. intracavity section length of an exemplary CRL according to the invention.

The length of the intracavity section of a CRL is a significant parameter, with the optimum length typically depending on the loss in the laser, on the effective core sizes, and on the pump power. The CRL output power typically has a fiber length dependence as exemplarily shown in FIG. 5. See also W. A. Reed et al., OFC '95 *Technical Digest*, p.107, WD1. In order to make a CRL relatively insensitive to small variations in splice and/or grating loss, it will frequently be desirable to choose an intracavity section of length slightly longer than the length at which the output power is maximum, for a given pump power. As a consequence of the above disclosed design changes, this length is generally substantially less than the corresponding length in analogous prior art CRLs. The latter is frequently about 1 km, whereas the former is typically about 500 m. This length reduction can contribute to increased conversion efficiency, as well as to reduced cost. However, the intracavity section of a CRL according to the invention is not necessarily less than 1 km. It typically is in the range 300–1200 m, preferably less than about 700 m.

Figure 6:
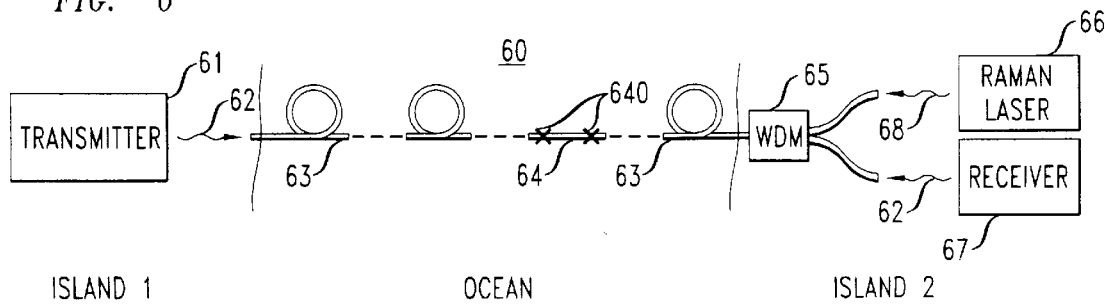
FIG. 6 schematically depicts an exemplary article according to the invention, namely, a remotely pumped optically amplified optical fiber communication system that comprises a CRL according to the invention.

FIG. 6 schematically depicts an exemplary article according to the invention, namely, a remotely pumped optical fiber communication system 60 comprising transmitter 61 (exemplarily disposed on island 1) and receiver 67 (exemplarily disposed on island 2). Signal radiation 62 (e.g., of wavelength 1.55 $\mu$m) is coupled into conventional transmission fiber 63 and transmitted therethrough to optical amplifier fiber 64 and on to the receiver. Pump radiation 68 for the optical amplifier fiber is provided by CRL 66 according to the invention, coupled into the transmission fiber by conventional WDM 65, and transmitted therethrough to the optical amplifier fiber, exemplarily Er-doped fiber. The Raman laser is selected to provide radiation of a wavelength (e.g., 1.48 µm) suitable for pumping of the optical amplifier fiber such that the signal radiation is amplified.

CRLs according to the invention exemplarily can also be used to provide pump radiation for a Raman amplifier, for instance an amplifier for 1.31 µm or 1.55 µm signal radiation, and optical fiber communication systems with such amplifiers and a CRL according to the invention are contemplated. It is also likely that CRLs according to this invention, with or without pump radiation source, will become an article of commerce, and all such embodiments of the invention are contemplated.

EXAMPLE 1

A CRL was made substantially as shown in FIG. 2. The center wavelengths of the fiber Bragg gratings were 1116 nm (pump reflector), 1174 nm, 1239 nm, 1311 nm, 1394 nm and 1484 nm, and the FWHM of the gratings was 2.0 nm, 1.8 nm, 2.0 nm, 1.9 nm, 2.0 nm and 1.8 nm, respectively. The 1484 nm grating in the output section (output coupler) had 25% reflectivity. The intracavity section had length 1 km, and the fiber was germanosilicate fiber with core delta of 1.16%, core radius 2.0 µm, depressed cladding delta of −0.27%, depressed cladding outer radius 4.5 µm, and undoped silica outer cladding. Pumping the CRL with 1116 nm pump radiation from a conventional source resulted in laser output at 1484 nm. The CRL had 700 mW threshold and 47% slope efficiency (input power−threshold)/(output power).

EXAMPLE 2

A CRL was made as in Example 1, except that the output coupler (1485 nm grating in the output section) and the pump reflector (1115 nm grating in the output section) were interchanged, and the output coupler had 10% reflectivity. The CRL had 688 mW threshold and 52% slope efficiency. The gratings were not identical to those of Example 1, but the differences in center wavelength and FWHM were insignificant.

EXAMPLE 3

A CRL was made substantially as in Example 2, except that i) the pump reflector was placed between the output coupler and the 1175 nm grating in the output section; ii) the output coupler reflectivity was 23%; iii) the fiber had core delta of 1.67%, core radius of 1.7 µm, depressed cladding delta of −0.07% and depressed cladding outer radius of 22.5 µm, and the length of the intracavity section was 480 m. The CRL had 384 mW threshold and slope efficiency of 56%. The gratings were not identical to those of Example 2, but the differences in center wavelength and FWHM were insignificant.

The invention claimed is:

1. An article comprising a Raman fiber laser adapted for receiving pump radiation of wavelength $\lambda_p$ and for emitting output radiation of wavelength $\lambda_n > \lambda_p$, the Raman fiber laser comprising a) a length of optical fiber comprising an intracavity section of length L disposed between an input section and an output section, said input section and output section each comprising fiber Bragg gratings having center wavelengths $\lambda_1, \lambda_2 \ldots \lambda_n$, where $n \geq 2$ and $\lambda_1 < \lambda_2 < \ldots \lambda_n$;

CHARACTERIZED IN THAT b) in the input section the fiber Bragg gratings of center wavelengths $\lambda_1, \lambda_2 \ldots \lambda_n$ are disposed in sequence according to center wavelength, with center wavelength increasing with increasing distance from the intracavity section;

c) in the output section the fiber Bragg gratings of center wavelengths $\lambda_1, \lambda_2 \ldots \lambda_{n-1}$ are disposed in sequence according to center wavelength, with center wavelengths increasing with increasing distance from the intracavity section; and d) in the output section the fiber Bragg grating of center wavelength $\lambda_n$ is disposed between the intracavity section and the fiber Bragg grating with center wavelength $\lambda_{n-1}$.

2. Article according to claim 1, wherein in the output section the fiber Bragg grating of center wavelength $\lambda_n$ is disposed between the intracavity section and the fiber Bragg grating with center wavelength $\lambda_1$.

3. Article according to claim 1, wherein the fiber Bragg grating of center wavelength $\lambda_n$ in the output section has peak reflectivity in the range 10–25%.

4. Article according to claim 1, wherein the output section comprises a fiber Bragg grating of center wavelength $\lambda_p$ disposed farther from the intracavity section than the fiber Bragg grating of center wavelength $\lambda_1$.

5. Article according to claim 4, wherein the fiber Bragg grating of center wavelength $\lambda_p$ is disposed farther from the intracavity section than the fiber Bragg grating of center wavelength $\lambda_{n-1}$.

6. Article according to claim 2, wherein the output section further comprises a fiber Bragg grating of center wavelength $\lambda_p$ disposed farther from the intracavity section than the fiber Bragg grating of center wavelength $\lambda_{n-1}$.

7. Article according to claim 1, wherein at least one of said fiber Bragg gratings has a full width at half maximum reflection bandwidth in the range 0.8–2.0 nm.

8. Article according to claim 1, wherein a center wavelength spacing between successive fiber Bragg gratings corresponds to a frequency shift in the range 11.7–14.9 THz.

9. Article according to claim 1, wherein the intracavity section, input section and output section all comprise silica-based optical fiber having a core delta in the range 1.0–1.8% and a cladding delta in the range −0.05 to −0.1%, where the core delta is $(n_c - n_o)/n_o$ and the cladding delta is $(n_{cl} - n_o)/n_o$, where $n_c$ and $n_{cl}$ are the core effective refractive index and the refractive index of the depressed cladding, respectively, and $n_o$ is the refractive index of fused silica.

10. Article according to claim 1, wherein L is in the range 300–1200 m.

11. Article according to claim 2, wherein a) the fiber Bragg grating of center wavelength $\lambda_n$ has peak reflectivity in the range 10–25%;

b) the output section comprises a fiber Bragg grating of center wavelength $\lambda_p$ disposed farther from the intracavity section than the fiber Bragg grating of center wavelength $\lambda_{n-1}$; and c) a multiplicity of said fiber Bragg gratings is selected to have reflectivity having a full width at half maximum reflection bandwidth in the range 0.8–2.0 nm.

12. Article according to claim 11, wherein a) a center wavelength spacing between successive fiber Bragg gratings corresponds to a frequency shift in the range 11.7–14.9 THz;

b) the intracavity section, input section and output section all comprise silica-based optical fiber having a core delta in the range 1.0–1.8% and a cladding delta in the range −0.05 to −0.1%, where the core delta is $(n_c-n_o)/n_o$ and the cladding delta is $(n_{cl}-n_o)/n_o$, where $n_c$ and $n_{cl}$ are the core effective refractive index and the refractive index of the depressed cladding, respectively, and $n_o$ is the refractive index of fused silica; and c) L is in the range 300–700 m.

13. Article according to claim 1, wherein the article is an optical fiber communication system.

14. An article comprising a Raman fiber laser adapted for receiving pump radiation of wavelength $\lambda_p$ and for emitting output radiation of wavelength $\lambda_n > \lambda_p$, the Raman fiber laser comprising a) a length of optical fiber comprising an intracavity section of length L disposed between an input section and an output section, said input section and output section each comprising fiber Bragg gratings having center wavelengths $\lambda_1, \lambda_2 \ldots \lambda_n$, where $n \geq 2$ and $\lambda_1 < \lambda_2 < \ldots \lambda_n$;

CHARACTERIZED IN THAT b) in both the input section and the output section the fiber Bragg gratings with center wavelengths $\lambda_1, \lambda_2 \ldots \lambda_n$ are disposed in sequence according to center wavelength, with center wavelengths increasing with increasing distance from the intracavity section; and c) the output section further comprises a fiber Bragg grating of center wavelength $\lambda_p$ disposed farther from the intracavity section than the fiber Bragg grating of center wavelength $\lambda_1$.

15. Article according to claim 14, wherein a) the fiber Bragg grating of center wavelength $\lambda_n$ has a peak reflectivity in the range 10–25%;

b) a multiplicity of said fiber Bragg gratings is selected to have reflectivity having a full width at half maximum in the range 0.8–2.0 nm;

c) a center wavelength spacing between successive fiber Bragg gratings corresponds to a frequency shift in the range 11.7–14.9 THz;

d) the intracavity section, input section and output section all comprise silica-based optical fiber having a core delta in the range 1.0–1.8% and a cladding delta in the range −0.05 to −0.1%, where the core delta is $(n_c-n_o)/n_o$ and the cladding delta is $(n_{cl}-n_o)/n_o$, where $n_c$ and $n_{cl}$ are the core effective refractive index and the refractive index of the depressed cladding, respectively, and $n_o$ is the refractive index of fused silica; and e) L is in the range 300–700 m.

* * * * *